United States Patent
Kim

(12) United States Patent (10) Patent No.: US 6,382,592 B1
Kim (45) Date of Patent: May 7, 2002

(54) VALVE

(76) Inventor: Jong Wok Kim, Cho Won Apt 713-109, 896-6 PyongChon-Dong, DongAn-Gu, AnYang-City, KyongGi-Do 431-070 (KR)

( * ) Notice: Subject to any disclaimer, the term of this patent is extended or adjusted under 35 U.S.C. 154(b) by 0 days.

(21) Appl. No.: 09/654,651

(22) Filed: Sep. 5, 2000

(51) Int. Cl.[7] .......................... F16K 31/00; F16K 31/44; F16K 51/00
(52) U.S. Cl. .......................... 251/335; 251/77; 251/215; 251/288
(58) Field of Search .................... 251/77, 215, 288, 251/333, 335

(56) References Cited

U.S. PATENT DOCUMENTS

| | | | |
|---|---|---|---|
| 3,581,728 A | * 6/1971 | Abraham et al. | 123/188 |
| 4,363,466 A | 12/1982 | Barlett | 251/357 |
| 4,732,192 A | 3/1988 | Shen | 137/614.19 |
| 4,751,943 A | 6/1988 | Chi | 137/625.31 |
| 5,447,203 A | * 9/1995 | McLoughlin et al. | 169/70 |

* cited by examiner

Primary Examiner—Philippe Derakshani
Assistant Examiner—David A. Bonderer
(74) Attorney, Agent, or Firm—William J. Sapone; Coleman Sudol Sapone P.C.

(57) ABSTRACT

A valve has a valve body, a valve sheet formed in the valve body which contacts the valve sheet in an axial direction, to thereby open and close the valve sheet with a knurling portion and a screwing action. A handle is combined with a handle combination unit formed in an upper portion of the valve body, so that a valve rod can ascend and descend. An oil storage chamber is located between the knurling portion and the screw, to maintain the ascending and descending of the valve rod. The angular slope in the screw thread is formed so as open and close the valve by 90° rotation of the valve rod. A stem contacts the valve sheet, the stem having a conical end portion, which is received by the valve sheet. The handle is flexibly manipulated to simply and swiftly control flow and entrance/exit of fluid. The valve can be used semi-perpetually since wear of the valve sheet is prevented, providing excellent general purpose usability.

3 Claims, 3 Drawing Sheets

VALVE

BACKGROUND OF THE INVENTION

1. Field of the Invention

The present invention relates to a valve, and more particularly, to a valve having a handle which can be smoothly manipulated to thereby simply and swiftly control flow and entrance/exit of fluid, in which a wear of a valve sheet is prevented in advance to use the valve semi-perpetually.

2. Description of the Related Art

In general, valves are widely used in various industrial fields since they simply and swiftly control flow and entrance/exit of gas or fluid flowing in a tube.

FIG. 4 is a sectional view of a conventional valve. As shown in FIG. 4, a valve 60 includes a valve body 61, and a valve rod 65 which can open and close a valve sheet 63 formed in the valve body 61. A handle 70 by which the valve rod 65 can ascend and descend is installed in the upper portion of the valve body 61.

However, the conventional valve 60 employs such a configuration that an air-tight state is maintained by interposing a single O-ring 67 in the valve rod 65 which ascends and descends by the handle 70. Thus, oil cannot be stayed for a long time in order to have the valve rod 65 smoothly ascend and descend in the periphery of the O-ring 67. As a result, oil is easily worn out, which causes the handle 70 not to be smoothly and simply manipulated.

Also, the conventional valve 60 adopts a configuration which can open and close the valve sheet 63 in which a rubber packing 69 is installed in the end of a stem 68 or the valve rod 65. However, since the rubber packing 69 blocks a wider area than that of the valve sheet 63, the rubber packing 69 is worn out or broken when using it for long, which causes the air-tight state not to be maintained.

In addition, a screw 65a formed in the valve rod 65 has a small angular slope in the screw thread in the case of the conventional valve 60.

In the case that the angular slope in the screw thread of the screw 65a is small, an opening and closing distance is long. As a result, the handle should be turned several times in order to control flow and entrance/exit of fluid, which causes a user to feel burdensome.

SUMMARY OF THE INVENTION

To solve the above problems, it is an object of the present invention to provide a valve having an excellent general purpose usability in which a handle can be flexibly manipulated to thereby simply and swiftly control flow and entrance/exit of fluid.

It is another object of the present invention, to provide a valve which can be used semi-perpetually in which a wear of a valve sheet is prevented in advance.

To accomplish the above object of the present invention, there is provided a valve having a valve body, a valve sheet formed in the valve body, a valve body which contacts the valve sheet in axial direction, to thereby open and close the valve sheet with a knurling portion and a screw, and a handle combined with a handle combination unit formed in the upper portion of the valve body, so that the valve rod can ascend and descend, the valve comprising: an oil storage unit installed between the knurling portion and the screw, to smoothly maintain the ascending and descending of the valve rod; a two-line screw in which the angular slope of the screw thread in the screw is greatly formed so as to be opened and closed by rotation of 90° of the valve rod; and a stem which contacts the valve sheet in which the shape of the end portion of the stem is conical, wherein the sectional shape of the valve sheet is conical.

Here, it is preferable that the oil storage unit comprises: a rib protruding outwards from the outer circumferential surface of the valve rod; a plurality of grooves formed spaced by a predetermined interval in the rib; first and second O-rings disposed in the groove; and an oil storage chamber formed between the first and second O-rings.

It is also effective to form the stem by use of engineering plastic. Also, it is preferable that a washer is interposed between the valve rod and the stem.

Meanwhile, it is effective to further comprises: at least one stopper protruding outwards from the inner wall of the handle; and at least one rotation prevention portion formed in the outer circumferential portion of the combination unit, and contacting the stopper, to thereby prevent the handle from rotating by more than 90°.

BRIEF DESCRIPTION OF THE DRAWINGS

The above objects and other advantages of the present invention will become more apparent by describing the preferred embodiment thereof in more detail with reference to the accompanying drawings in which.

DETAILED DESCRIPTION OF THE INVENTION

A preferred embodiment of the present invention will be described with reference to the accompanying drawings.

Figure 1:
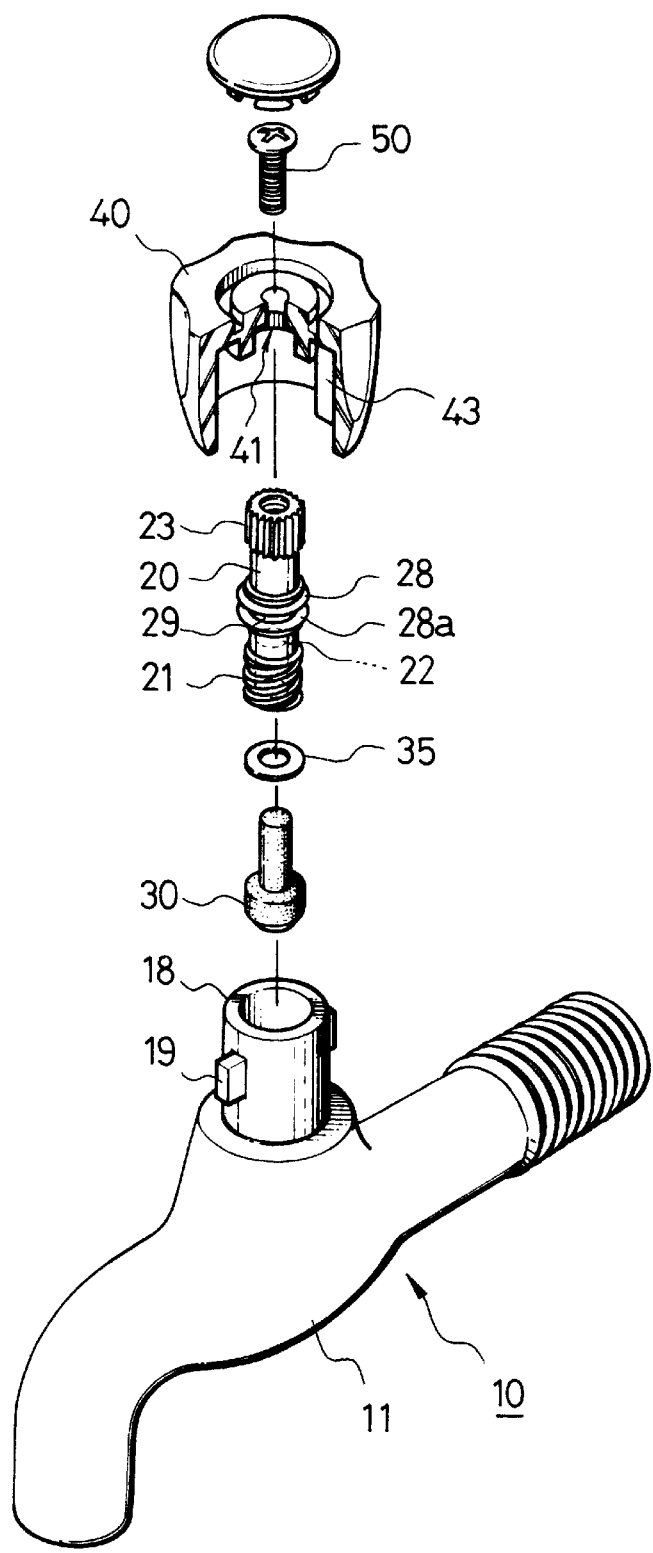
FIG. 1 is an exploded perspective view of a valve according to the present invention.
Figure 2:
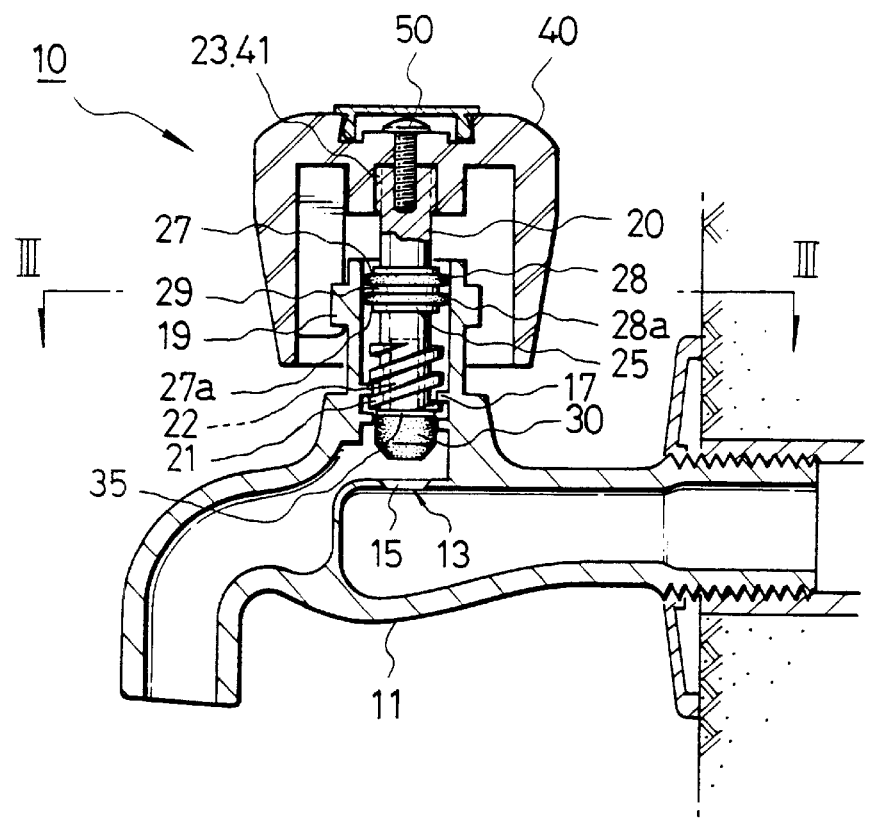
FIG. 2 is a sectional view showing the assembled state of the FIG. 1 valve.
Figure 3:
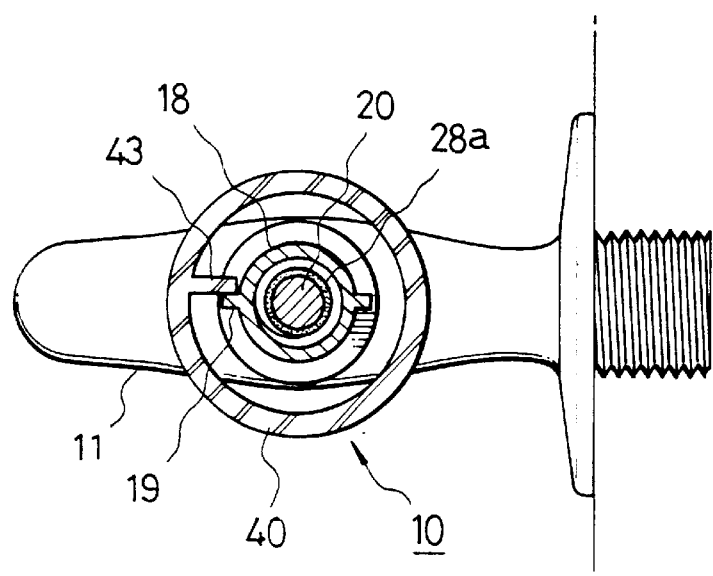
FIG. 3 is a sectional view of FIG. 2 taken along the line III—III.
Figure 4:
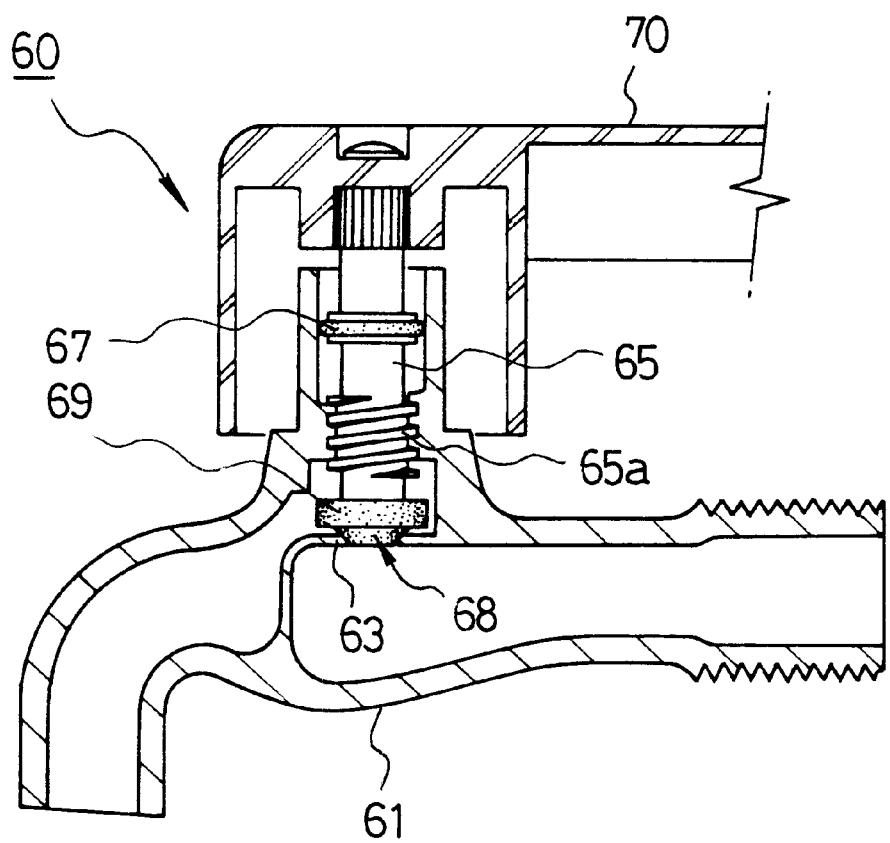
FIG. 4 is a sectional view of a conventional valve.

As shown in FIGS. 1 through 3, a valve 10 includes a valve body 11, a valve rod 20 and a handle 40 for rotating the valve rod 20.

In the valve body 11 is provided a valve sheet 13 which contacts a stem 30, and whose end shape is conical. At the center of the valve sheet 13 is a throughhole 15 for guiding flow and entrance/exit of fluid by the stem 30.

To the upper side of the valve sheet 13, that is, the throughhole 15 is positioned the valve rod 20 along the axial direction. The valve rod 20 has a male screw 21 on the upper portion of which a knurling portion 23 is formed.

The male screw 21 formed in the valve rod 20 is threadedly engaged with a female screw 17 formed inside the upper portion of the valve body 11. The knurling portion 23 is combined with a combination hole 41 formed inside the handle 40, so as to rotate in the same direction as that of the handle 40. The handle 40 and the valve rod 20 are fixed by means of a bolt 50.

Meanwhile, a rib 25 having a relatively larger diameter than that of the section of the valve rod is formed in the valve rod 20. A plurality of annular grooves 27 and 27a are formed spaced by a predetermined distance up and down in the rib 25.

First and second O-rings 28 and 28a are disposed in the grooves 27 and 27a. Thus, the first and second O-rings 28 and 28a contact the inner wall of the upper portion of the valve body 11, to form an oil storage chamber 29.

Also, the stem 30 is inserted into an axial hole 22 formed at the bottom of the valve rod 20. The end of the stem 30 is formed in conical fashion, in order to be inserted into the throughhole 15, to thereby open and close flow of fluid.

Here, a washer 35 is interposed between the valve rod 20 and the stem 30, to prevent a mutual wear between the valve rod 20 and the stem 30. The stem 30 is formed made of engineering plastic.

Meanwhile, a rotation prevention portion 19 is formed in the upper portion of the valve body 11, that is, the handle combination unit 18. On the inner wall of the handle 40 is formed the stopper 43 which contacts the rotation prevention portion 19 for preventing the handle 40 from being rotated by more than 90°.

In the valve 10 having the above-described configuration according to the present invention, the 90° rotation of the handle 40 enables the valve rod 20 to be raised. In other words, since the angular slope of the female/male screws 17 and 21 are formed greatly, the valve rod 20 are raised even by the 90° rotation.

When the valve rod 20 has been raised, the pressure of the valve rod 20 pressing the stem 30 is released. Thus, the pressure released stem 30 is raised toward the axial hole 22 by the pressure of the fluid at the state where the throughhole 15 formed in the valve sheet 13 has been closed.

As described above, when the valve rod 20 is raised, the fluid flows in one direction via the throughhole 15. When the handle 40 returns to the original position, the valve rod 20 is descendent. The stem 30 is pressingly supported by the descended valve rod 20, to thereby close the throughhole 15 and block the flow of the fluid.

Meanwhile, the first and second O-rings 28 and 28a installed in the valve rod 20 repeatedly ascends and descends by means of the handle 40, to accordingly friction-contact the inner wall of the upper portion of the valve body 11. Here, the ascending and descending valve rod 20 enables the oil stored in the oil storage chamber 29 to be maintained without leaking between the inner wall of the upper portion of the valve body 11 and the first and second O-rings 28 and 28a. As a result, the valve rod 20 maintains flexibility to thereby facilitate the control of the handle 40.

The washer 35 disposed between the valve rod 20 and the stem 30 plays a role of preventing the mutual wear between the valve rod 20 and the stem 30. Also, since the stem 30 is made of engineering plastic, the wear of the valve sheet 13 or the throughhole 15 can be prevented even in the repeated ascending and descending operations.

As described above, the present invention enables the handle to be flexibly manipulated, to thereby simply and swiftly control flow and entrance/exit of fluid. The valve can be used semi-perpetually since a wear of a valve sheet is prevented in advance, to thereby provide an excellent general purpose usability.

What is claimed is:

1. A valve having a valve body, a valve sheet formed in the valve body, the valve body coming into contact with the valve sheet along an axial direction, to thereby open and close the valve sheet by the operation of a knurled portion and a screwing action, a handle combined with a handle combination unit formed in the upper portion of the valve body, so that a valve rod can ascend and descend therein, the valve comprising:

a plurality of ribs protruding outwardly from an outer circumferential surface of the valve rod;

a plurality of grooves formed in the outer circumferential surface of the valve rod, to space the plurality of ribs by a predetermined interval; first and second O-rings disposed in the plurality of grooves;

an oil storage chamber formed between the first and second O-rings;

screw threads formed on the valve rod, having an angular slope such that the valve is opened and closed by a 90° rotation of the valve rod; and, a stem which contacts the valve sheet, a shape of an end portion of the stem being conical, wherein the valve sheet is shaped to receive the conical end portion of the stem.

2. The valve of claim 1, wherein a washer is interposed between the valve rod and the stem.

3. The valve of claim 1, further comprising: at least one stopper protruding outwardly from an inner wall of the handle; and at least one rotation prevention portion formed in an outer circumferential portion of the handle combination unit, and contacting the stopper, to thereby prevent the handle from rotating by more than 90°.

* * * * *